3,431,252
5,5-DIALKYL-D-RIBOFURANOSYL PURINE
COMPOUNDS AND INTERMEDIATES
Edward Walton, Scotch Plains, N.J., assignor to Merck
& Co., Inc., Rahway, N.J., a corporation of New
Jersey
No Drawing. Filed Apr. 1, 1966, Ser. No. 539,318
U.S. Cl. 260—209                                6 Claims
Int. Cl. C07d 51/50; C07c 47/18

ABSTRACT OF THE DISCLOSURE (5,5 - dialkyl - D - ribofuranosyl) - 2,6 - substituted purine compounds are prepared by treating a 2,3,5-tri-O-acyl-5,5-dialkyl-D-ribofuranosyl halide with a chloromercuri 2,6-substituted purine to form a 9-(2,3,5-tri-O-acyl - 5,5 - dialkyl - D - ribofuranosyl) - 2,6 - substituted purine and then hydrolyzing the acyl groups of the latter compounds. The 5′,5′-dimethyladenosine demonstrates in vitro activity against *Diplococcus pneumoniae*.

---

This invention relates to novel and useful nucleosides. More particularly, the present invention relates to novel nucleosides that are useful in their own right and are also useful in the preparation of other more complicated nucleosides and nucleotides. Specifically, the present invention relates to novel 2,6-substituted purine 5′,5′-dialkyl nucleosides.

The novel compounds of the present invention may be represented by the following structural formula:

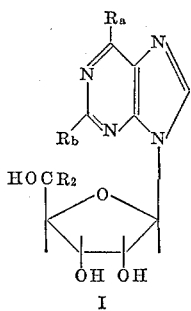

I wherein R is lower alkyl and $R_a$ and $R_b$ may be the same or different hydrogen, hydroxy, lower alkyl, amino, alkylamino, dialkylamino, halo, mercapto or lower alkyl mercapto.

The object of the present invention is to provide novel 2,6-substituted purine, 5′,5′-dialkyl nucleosides which may be reacted to form a variety of different nucleoside and nucleotide compounds. When used as intermediates, the compounds of the present invention may be utilized in the preparation of various 5′,5′-dialkyl nucleotides by their reaction with phosphorus compounds. These nucleotides may be useful in the study of nucleic acid metabolism.

Other additional objects of the present invention will become apparent to those skilled in the art by reading the following specification.

Typical of the group $R_a$ and $R_b$ in the compounds of the present invention, compounds I, are hydrogen; alkyl such as methyl, ethyl and propyl, amino; alkylamino groups such as methylamino, dimethylamino, ethylamino, diethylamino, propylamino, dipropylamino; halogens such as chlorine and bromine; mercapto and alkyl mercapto, methyl mercapto, ethyl mercapto, and propyl mercapto.

The compounds of the present invention are prepared in general by a two-step process. The first step in this process, step A, is carried out by treating a 2,3,5-tri-O-acyl-5,5-dialkyl-D-ribofuranosyl halide of the following formula

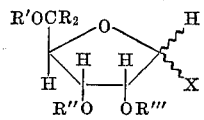

II with a chloromercuri 2,6-substituted purine of the formula

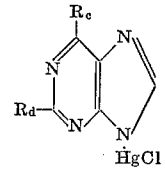

III to form 9-(2,3,5-tri-O-acyl-5,5-dialkyl-D-ribofuranosyl)-2,6-substituted purine intermediates of the formula

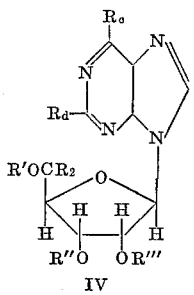

IV wherein R is lower alkyl, $R_c$ and $R_d$ are halogen, hydrogen, hydroxy, alkyl, acylamino or acyl alkylamino, and R′, R″, and R‴ may be the same or different acyl groups and X is a halogen. The reaction should be carried out in a temperature range of from about 25° C. to about 150° C. and preferably between 100° C. and 140° C. for a period of time to complete the reaction. This time is usually from about 15 minutes to about 5 hours. It should be noted that the higher the reaction temperature range, the quicker the reaction will be complete. The 2,3,5-tri-O-acyl-5,5-dialkyl-D-ribofuranosyl halides are new compounds that may be prepared by hydrolyzing methyl 5,5-dialkyl - 2,3, - O - isopropylidine - D - ribofuranoside in aqueous-methanolic hydrochloric acid to form methyl 5,5-dialkyl-D-ribofuranoside which is acylated to produce methyl 2,3,5 - tri - O - acyl - 5,5 - dialkyl - D - ribofuranoside and converted into the ribofuranosyl halide by a halogen replacement reaction in an appropriate solvent.

The reaction depicting step A in the preparation of the compounds of the present invention is as follows:

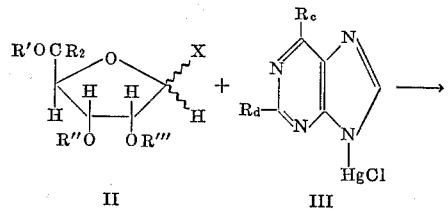

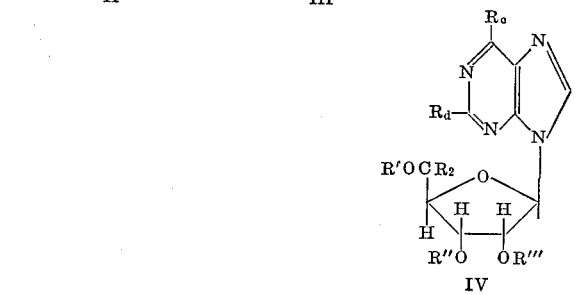

IV

The compounds of the present invention, Formula I′, wherein $R_a'$ and/or $R_b'$ may be the same or different hydrogen, halogen, hydroxy, alkyl, amine and lower alkyl substituted amine are prepared by a basic solvolysis reaction of the intermediate compounds, 9-(2,3,5-tri-O-acyl-5,5-dialkyl-D-ribofuranosyl)-2,6-substituted purines (Formula IV′).

This reaction is illustrated as follows:

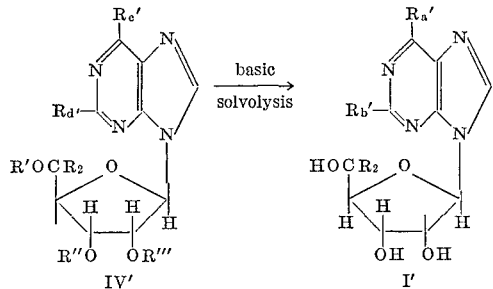

wherein in Formula IV, $R_c'$ and/or $R_d'$ are hydrogen, hydroxy, alkyl, acylamino, acyl alkylamino and halogen and R is a lower alkyl and in Formula I′, $R_a'$ and/or $R_b'$ are hydrogen, lower alkyl, hydroxy, amino, lower alkyl substituted amino and halogen.

In another aspect of the present invention, the compounds of Formula I″, wherein $R_a''$ and $R_b''$ are alkylamino and dialkylamino, are prepared by an aminolysis reaction of the intermediate compounds; 9-(2,3,5-tri-O-acyl-5,5-dialkyl-D-ribofuransoyl)-2,6-substituted purines, wherein the 2,6 purine positions are substituted either or both positions with a halogen, designated IV″.

The reaction is illustrated as follows:

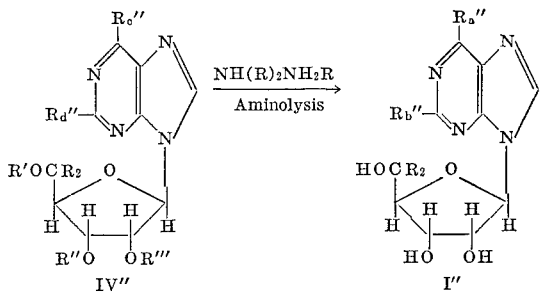

wherein in Formula IV″, $R_c''$ and/or $R_d''$, are halogen, R is a lower alkyl, R in the aminolysis reagents is a lower alkyl, $R_a''$ and $R_b''$ in Formula I″ may be the same or different alkylamino or dialkylamino and R is a lower alkyl.

In another aspect of the present invention the compounds of Formula I‴, wherein $R_a'''$, and/or $R_b'''$, are mercapto or lower alkyl substituted mercapto and R is lower alkyl are prepared by a mercaptolysis reaction, wherein R in the mercaptolysis reagents is also lower alkyl and M is an alkali or alkaline earth metal, $R_c'''$, and $R_d'''$, in Formula IV″ may be the same or different halogen, and R′, R″ and R‴ may be the same or different acyl.

The reaction is illustrated as follows:

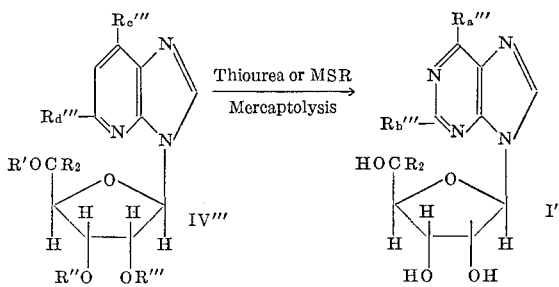

When the mercaptolysis reactant is thiourea the acyl blocking groups are not removed at R′, R″ and R‴ portions and the resulting intermediate must be subjected to basic solvolysis in order to obtain the compounds of the present invention, compound I‴.

In Formula IV‴, $R_c'''$, $R_d'''$, R, R′, R″, and R‴ are the same as in Formula IV above, and $R_a'''$ and $R_b'''$ in Formula I may be the same or different mercapto or lower alkyl substituted mercapto, and R is a lower alkyl. In general, the process of the present invention involves reacting a chloromercuri 2,6-substituted purine with a 2,3,5-tri-O-acyl-5,5-dialkyl-D-ribofuranosyl halide to form a 9-(2,3,5-tri-O-acyl-5,5-dialkyl - D - ribofuranosyl)-2,6-substituted purine. These intermediate compounds are then either solvolyzed, aminolyzed, or mercaptolyzed to form the compounds of the present invention. When mercaptolysis employing thiourea is used, a further step of solvolysis must follow in order to obtain the compounds of the present invention.

More specifically, the compounds of the present invention are obtained by reaction in step A a chloromercuri 2,6-substituted purine with a 2,3,5-tri-O-acyl-5,5-dialkyl-D-ribofuranosyl halide, essentially stoichiometrically at a temperature range of from about 25° C. to about 150° C. and preferably between about 100° C. and 140° C. In this step the reaction is carried out in an appropriate solvent. The selection of the solvent is not important as long as it is an inert solvent and that it boils in a range of about 25° C. to 150° C. Examples of such solvents are benzene, dibutyl ether, cyclohexane, toluene, xylene and the like. The preferred solvents are toluene and xylene. The reaction is normally complete in from about 15 minutes to about 5 hours depending on the selection of the reaction temperature. After obtaining the intermediate reaction product in step A, these compounds are then either solvolyzed, aminolyzed, or mercaptolyzed in step B depending upon the desired 2,6-substitutions in the purine portions of the compounds.

In the case of solvolysis, the reaction is carried out in the presence of a basic catalyst in an appropriate solvent in a temperature range of from about 5° C. to about 150° C. and preferably about 65° C. to about 90° C. in a reaction time of from about 15 minutes to about 5 hours. The length of reaction time is dependent upon the temperature, the catalyst and solvent used. Examples of basic catalysts are alkali and alkaline earth bases and their corresponding alkoxides, solutions of ammonia, amines and substituted amines. Examples of the solvents are $C_{1-4}$ alcohols. The preferred solvent is methanol.

In the case of aminolysis, the reaction is carried out in the presence of ammonia, a monoalkyl or a dialkylamine in a temperature range of from about 25° C. to about 150° C. and preferably about 85° C. to about 110° C. in a reaction time of from about 15 minutes to about 5 hours. Examples of amines are methylamine, dimethylamine, ethylamine, diethylamine, propylamine and dipropylamine.

In the case of mercaptolysis, the reaction is carried out in the presence of thiourea or a metal salt of a lower alkyl mercaptan in a temperature range of from about 25° C. to about 150° C. and preferably about 65° C. to about 90° C. in a reaction time of from about 15 minutes to about 5 hours. Examples of the alkali or alkaline earth metal salts of alkyl mercaptans may be sodium methylmercaptan, sodium ethylmercaptan, sodium isopropylmercaptan, potassium methylmercaptan and calcium methylmercaptan.

Representative of the novel compounds of the present invention but not limited to these compounds are 9-(5,5-dimethyl-D-ribofuranosyl)-2-methylpurine
9-(5,5-dimethyl-D-ribofuranosyl)-6-methylpurine
9-(5,5-dimethyl-D-ribofuranosyl)-2,6-dimethylpurine
9-(5,5-dimethyl-D-ribofuranosyl)-2-ethylpurine
9-(5,5-dimethyl-D-ribofuranosyl)-6-ethylpurine
9-(5,5-dimethyl-D-ribofuranosyl)-2,6-diethylpurine
9-(5,5-dimethyl-D-ribofuranosyl)-2-propylpurine
9-(5,5-dimethyl-D-ribofuranosyl)-6-proplypurine
9-(5,5-dimethyl-D-ribofuranosyl)-2,6-dipropylpurine 9-(5,5-diethyl-D-ribofuranosyl)-2-methylpurine
9-(5,5-diethyl-D-ribofuranosyl)-6-methylpurine
9-(5,5-diethyl-D-ribofuranosyl)-2,6-dimethylpurine
9-(5,5-diethyl-D-ribofuranosyl)-2-ethylpurine
9-(5,5-diethyl-D-ribofuranosyl)-6-ethylpurine
9-(5,5-diethyl-D-ribofuranosyl)-2,6-diethylpurine
9-(5,5-diethyl-D-ribofuranosyl)-2-propylpurine
9-(5,5-diethyl-D-ribofuranosyl)-6-propylpurine
9-(5,5-diethyl-D-ribofuranosyl)-2,6-dipropylpurine
9-(5,5-dipropyl-D-ribofuranosyl)-2-methylpurine
9-(5,5-dipropyl-D-ribofuranosyl)-6-methylpurine
9-(5,5-dipropyl-D-ribofuranosyl)-2,6-dimethylpurine
9-(5,5-dipropyl-D-ribofuranosyl)-2-ethylpurine
9-(5,5-dipropyl-D-ribofuranosyl)-6-ethylpurine
9-(5,5-dipropyl-D-ribofuranosyl)-2,6-diethylpurine
9-(5,5-dipropyl-D-ribofuranosyl)-2-propylpurine
9-(5,5-dipropyl-D-ribofuranosyl)-6-propylpurine
9-(5,5-dipropyl-D-ribofuranosyl)-2,6-dipropylpurine
9-(5,5-dimethyl-D-ribofuranosyl)-2-aminopurine
9-(5,5-dimethyl-D-ribofuranosyl)-6-aminopurine
9-(5,5-dimethyl-D-ribofuranosyl)-2,6-diaminopurine
9-(5,5-diethyl-D-ribofuranosyl)-2-aminopurine
9-(5,5-diethyl-D-ribofuranosyl)-6-aminopurine
9-(5,5-diethyl-D-ribofuranosyl)-2,6-diaminopurine
9-(5,5-dipropyl-D-ribofuranosyl)-2-aminopurine
9-(5,5-dipropyl-D-ribofuranosyl)-6-aminopurine
9-(5,5-dipropyl-D-ribofuranosyl)-2,6-diaminopurine
9-(5,5-dimethyl-D-ribofuranosyl)-2-methylaminopurine
9-(5,5-dimethyl-D-ribofuranosyl)-6-methylaminopurine
9-(5,5-dimethyl-D-ribofuranosyl)-2,6-dimethylaminopurine
9-(5,5-diethyl-D-ribofuranosyl)-2-methylaminopurine
9-(5,5-diethyl-D-ribofuranosyl)-6-methylaminopurine
9-(5,5-diethyl-D-ribofuranosyl)-2,6-dimethylaminopurine
9-(5,5-dimethyl-D-ribofuranosyl)-2-ethylaminopurine
9-(5,5-dimethyl-D-ribofuranosyl)-6-ethylaminopurine
9-(5,5-dimethyl-D-ribofuranosyl)-2,6-diethylaminopurine
9-(5,5-diethyl-D-ribofuranosyl)-2-ethylaminopurine
9-(5,5-diethyl-D-ribofuranosyl)-6-ethylaminopurine
9-(5,5-diethyl-D-ribofuranosyl)-2,6-diethylaminopurine
9-(5,5-dipropyl-D-ribofuranosyl)-2-ethylaminopurine
9-(5,5-dipropyl-D-ribofuranosyl)-6-ethylaminopurine
9-(5,5-dipropyl-D-ribofuranosyl)-2,6-diethylaminopurine
9-(5,5-dimethyl-D-ribofuranosyl)-2-hydroxypurine
9-(5,5-dimethyl-D-ribofuranosyl)-6-hydroxypurine
9-(5,5-dimethyl-D-ribofuranosyl)-2,6-dihydroxypurine
9-(5,5-diethyl-D-ribofuranosyl)-2-hydroxypurine
9-(5,5-diethyl-D-ribofuranosyl)-6-hydroxypurine
9-(5,5-diethyl-D-ribofuranosyl)-2,6-dihydroxypurine
9-(5,5-dimethyl-D-ribofuranosyl)-2-methyl-6-aminopurine
9-(5,5-diethyl-D-ribofuranosyl)-2-amino-6-methylpurine
9-(5,5-dimethyl-D-ribofuranosyl)-2-methyl-6-methylaminopurine
9-(5,5-dimethyl-D-ribofuranosyl)-2-methylamino-6-methylpurine
9-(5,5-dimethyl-D-ribofuranosyl)-2-amino-6-methylaminopurine
9-(5,5-dimethyl-D-ribofuranosyl)-2-methyl-6-hydroxypurine
9-(5,5-dimethyl-D-ribofuranosyl)-2-hydroxy-6-methylpurine
9-(5,5-dimethyl-D-ribofuranosyl)-2-amino-6-hydroxypurine
9-(5,5-dimethyl-D-ribofuranosyl)-2-hydroxy-6-aminopurine
9-(5,5-dimethyl-D-ribofuranosyl)-2-methylamino-6-hydroxypurine
9-(5,5-dimethyl-D-ribofuranosyl)-2-hydroxy-6-methylaminopurine
9-(5,5-dimethyl-D-ribofuranosyl)-2-dimethylaminopurine
9-(5,5-dimethyl-D-ribofuranosyl)-6-dimethylaminopurine
9-(5,5-dimethyl-D-ribofuranosyl)-2-methylamino-6-dimethylaminopurine
9-(5,5-dimethyl-D-ribofuranosyl)-2-mercaptopurine
9-(5,5-dimethyl-D-ribofuranosyl)-6-mercaptopurine
9-(5,5-dimethyl-D-ribofuranosyl)-2,6-dimercaptopurine
9-(5,5-dimethyl-D-ribofuranosyl)-2-methyl-6-mercaptopurine
9-(5,5-dimethyl-D-ribofuranosyl)-6-methylmercaptopurine
9-(5,5-dimethyl-D-ribofuranosyl)-2-mercapto-6-methylmercaptopurine
9-(5,5-dimethyl-D-ribofuranosyl)-2,6-dichloropurine
9-(5,5-dimethyl-D-ribofuranosyl)-2-chloropurine
9-(5,5-dimethyl-D-ribofuranosyl)-2-bromopurine
9-(5,5-dimethyl-D-ribofuranosyl)-6-bromopurine
9-(5,5-dimethyl-D-ribofuranosyl)-6-chloropurine
9-(5,5-dimethyl-D-ribofuranosyl)-2,6-dibromopurine.

The compounds of the present invention have also demonstrated valuable antibiotic properties. They suppress the growth of pathogenic bacteria, as for example, they have demonstrated growth inhibition properties against *Diplococcus pneumoniae*.

The compounds of the present invention furthermore may be converted to nucleotides by treatment with phosphoric acid derivatives in accordance with known techniques. As such, they are useful in a formulation of media for selective culturing of animal tissue cells. These nucleotides may also be useful in the study of nucleic acid metabolism.

The following examples illustrate the compounds of the present invention, but it is to be understood that they are given for the purpose of illustration and not of limitation.

Example 1.—Preparation of 2,3,5-tri-O-benzoyl-5,5-dimethyl-O-ribofuranosyl bromide This example shows the synthesis of a novel starting material used in the preparation of the compound of the present invention.

A solution of 5 g. (21.5 mmoles) of methyl 5,5-dimethyl-2,3-O-isopropylidine-β-D-ribofuranoside in 100 ml. of methanol is treated with 12.5 ml. of a solution made by diluting 1.5 ml. of concentrated HCl to 15 ml. with methanol. After 3.5 hr., 3 g. of NaHCO$_3$ is added. After being stirred, the mixture is filtered and the solids are washed with 150 ml. of warm ethyl acetate in 4 portions. Concentration of the filtrate gives 5.5 g. of residual oil. Chromatography on 100 g. of silica gel in ethyl acetate-chloroform (4:1) gives 1.8 g. of starting material and 1.72 g. (42%) of noncrystalline methyl 5,5-dimethyl-β-D-ribofuranoside.

A solution of 1.72 g. (9.0 mmoles) of methyl 5,5-dimethyl-β-D-ribofuranoside in 50 ml. of dry pyridine is stirred at 5° C. and treated with 7.5 g. (54 mmoles) of benzoyl chloride. Mono benzoylation occurs rapidly while complete conversion to the 2,3-di-O-benzoyl derivative requires about 15 minutes. The completely benzoylated product is obtained after heating at 95° C. for 20 hours. About 2 ml. of water is added; the mixture is stirred for 15 minutes and poured into ice water and chloroform and acidified with cold 10% HCl. The layers are separated and the water layer is washed with 10% KHCO$_3$ and dried. Concentration gives 5.55 g. of oil which crystallizes from benzene-petroleum ether. The crude product is chromatographed on 80 g. of silica in chloroform-ethyl acetate (19:1). About 3.9 g. of purified product is obtained which when recrystallized from benzene-petroleum ether gives 3.29 g. (73%) of methyl 5,5-dimethyl-2,3,5-tri-O-benzoyl-β-D-ribofuranoside.

A solution of 3 g. (6.0 mmoles) of methyl 2,3,5-tri-O-benzoyl-5,5-dimethyl-β-D-ribofuranoside in 15 ml. of acetic acid is cooled to 5° C. and treated with 0.5 ml. of acetyl bromide and 15 ml. of a 32% (w./w.) solution of HBr in acetic acid. The mixture is kept at 25° C. for 18 minutes; a small amount of solid precipitates. The mixture is concentrated and 3 portions of dry toluene are distilled from the residue to remove last traces of HBr and acetic acid. The residual 2,3,5-tri-O-benzoyl-5,5- dimethyl-ribofuranosyl bromide is used in the next step without further purification.

Example 1A.—Preparation of 2,3,5-tri-benzoyl-5,5-diethyl-D-ribofuranosyl bromide A solution of 52.5 g. (0.344 mole) of ethyl iodide in 200 ml. of ether is added to 8.35 g. (0.344 mole) of magnesium ribbon in 40 ml. of ether over a period of about 2 hours. A solution of 20 g. (0.086 mole) of methyl (methyl 2,3-O-isopropylidine-β-ribofuranosiduronate) in 150 ml. of ether is added to the Grignard reagent over a period of 1.5 hour. The mixture is refluxed 1 hour, cooled and poured onto a mixture of ice and 28.6 ml. of concentrated hydrochloric acid. The ether layer and 3 ether extracts are combined and washed with potassium bicarbonate solution. The ether solution is concentrated to a residue of methyl 5,5-diethyl-2,3-O-isopropylidine-β-D-ribofuranoside.

When equivalent amounts of methyl 5,5-diethyl-2,3-O-isopropylidine-β-D-ribofuranoside are substituted for methyl 5,5-dimethyl-2,3-O-isopropylidine-β-D-ribofuranoside in Example 1, 2,3,5-tri-benzoyl-5,5-diethyl-D-ribofuranosyl bromide is produced.

Example 2.—Preparation of 9-(2,3,5-tri-O-benzoyl-5,5-dimethyl-D-ribofuranosyl)-2-acetamido-6-hydroxypurine About 25 ml. of xylene is distilled from a suspension of 5.95 grams (0.014 M) of chloromercuri 2-acetamido-6-hydroxypurine in 175 ml. of xylene to remove the last traces of water. The suspension is cooled to 25° C. and 2,3,5-tri-O-benzoyl-5,5-dimethyl-D-ribofuranosyl bromide prepared from 7.05 grams (0.014 M) of methyl 2,3,5-tri-O-benzoyl-5,5-dimethyl-D-ribofuranoside in 25 ml. of dry xylene is added. The mixture is stirred and heated at a temperature of from about 50° C. to about 100° C. The solid changes from a granular form to flocculent. After being refluxed for one hour, the hot mixture is filtered, which removes the undissolved solids. Leaching the solids with three 50-ml. portions of boiling chloroform removes additional soluble product and leaves insoluble starting chloromercuri derivatives and inorganic salts. The original filtrate is diluted with two volumes of petroleum ether and the solid which separates is dissolved in the chloroform solution obtained above. The chloroform solution plus an additional 100 ml. is washed with two 75-ml. portions of 30% potassium iodide solution and two 75-ml. portions of water. The dry chloroform layer is concentrated and 9-(2,3,5-tri-O-benzoyl-5,5-dimethyl-D-ribofuranosyl-2-acetamido-6-hydroxypurine is obtained.

Example 3.—Preparation of 9-(2,3,5-tri-O-benzoyl-5,5-diethyl-D-ribofuranosyl)-6-N-methylbenzamidopurine About 150 ml. of xylene is distilled from a suspension of 9.5 grams (19.5 mmoles) of chloromercuri 6-N-methylbenzamidopurine in 500 ml. of xylene. The mixture is cooled and a solution of 2,3,5-tri-O-benzoyl-5,5-diethyl-D-ribofuranosyl bromide (from 7.5 grams [14.1 mmoles] of methyl 2,3,5 - tri-O-benzoyl-5,5-diethyl-D-ribofuranoside) in 50 ml. of dry xylene is added. The reaction mixture is stirred and refluxed for 30 minutes. The hot mixture is filtered and 3 grams of unreacted starting chloromercuri purine is recovered. The filtrate is concentrated to dryness and the residual oil in 300 ml. of chloroform is washed with two 80-ml. portions of 30% potassium iodide solution and two 80-ml. portions of water. The residual oil obtained after removal of the chloroform is chromatographed on a short column of 140 grams of acid washed alumina in 9 to 1 benzene-chloroform. Fractions are combined and concentrated giving 9-(2,3,5-tri-O-benzoyl - 5,5 - diethyl - D - ribofuranosyl)-6-N-methyl-benzamidopurine.

A suspension of 3.9 grams (5.45 mmoles) of 9-(2,3,5-tri-O-benzoyl-5,5-diethyl-D-ribofuranosyl)-6-(N - methyl-benzamido)-purine in 40 ml. of dry methanol is treated with a solution made from 175 mg. (7.6 mg. atom) of sodium in 40 ml. of dry methanol and the solution is refluxed for 3.5 hours. The methanol is removed and the solution of the residue in 76 ml. of water is neutralized (pH 7.0) with acetic acid and washed with three 10-ml. portions of chloroform. The aqueous layer is concentrated by distillation to a residue of 9-(5,5-diethyl-D-ribofuranosyl)-6-methylaminopurine.

Example 4.—Preparation of 9-(2,3,5-tri-O-benzoyl-5,5-dimethyl-D-ribofuranosyl)-6-chloropurine About 100 ml. of xylene is distilled from a suspension of 6.55 grams (16.8 mmoles) of chloromercuri-6-chloropurine in 460 ml. of xylene in order to remove the last traces of water. A solution of 9.2 grams (16.8 mmoles) of 2,3,5-tri-O-benzoyl-5,5-dimethyl - D - ribofuranosyl bromide in 40 ml. of dry xylene is added to the stirred suspension at 25° C. The mixture is refluxed for 2 hours. The hot mixture is filtered to remove insoluble material. The filtrate is concentrated to 150 ml. and diluted with 300 ml. of petroleum ether. The mixture is kept at 5° C. for one hour and filtered. The solid is washed with three 20-ml. portions of petroleum ether and dried. The crude product is dissolved in 300 ml. of hot chloroform and washed with two 80-ml. portions of 30% potassium iodide solution and two 80-ml. portions of water. The dried (MgSO$_4$) chloroform layer is concentrated, and 9-(2,3,5-tri O-benzoyl-5,5-dimethyl-D-ribofuranosyl)-6-chloropurine is obtained. The product is purified by chromatography on a short alumina column in chloroform.

Example 5.—Preparation of 9-(2,3,5-tri-O-benzoyl-5,5-dimethyl-D-ribofuranosyl)-2,6-dibenzamidopurine About 100 ml. of xylene is distilled from suspension of 5.01 grams (8.43 mmoles) of chloromercuri 2,6-dibenzamido purine in 370 ml. of xylene to remove last traces of water. The suspension is cooled to room temperature in a solution of 4.67 grams (8.43 mmoles) of 2,3,5-tri-O-benzoyl-5,5-dimethyl-D-ribofuranosyl bromide in 37 ml. of dry xylene is added while the suspension is being stirred. The mixture is refluxed for 2 hours and filtered hot which removes insoluble material. The filtrate is diluted with 400 ml. of petroleum ether and cooled in an ice bath. The solid is removed and dried. The product is obtained as a complex with mercuric halide. The product is dissolved in 100 ml. of chloroform and washed with two 40-ml. portions of 30% potassium iodide solution and two 40-ml. portions of water. The dried (MgSO$_4$) chloroform solution is concentrated at reduced pressure to give 9-(2,3,5-tri-O-benzoyl-5,5-dimethyl -'D - ribofuranosyl)-2,6-di-benzamido purine.

Example 6.—Preparation of 9-(2,3,5-tri-O-benzoyl-5,5-dimethyl-D-ribofuranosyl)-6-methylpurine A suspenison of 3.7 grams (10 mmoles) of chloromercuri 6-methylpurine [Davoll and Lowy, J. Am. Chem. Soc. 73 1650 (1951)] in 200 ml. of xylene is dried by distilling about 50 ml. of xylene. The cooled suspension is treated with 5.53 grams (10 mmoles) of 2,3,5-tri-O-benzoyl - 5,5 - dimethyl-D-ribofuranosyl bromide dissolved in 30 ml. of dry xylene. The mixture is stirred and refluxed for 2 hours and it is filtered to remove insoluble material. The filtrate is diluted with 4 volumes of petroleum ether and, after being cooled for about 2 hours in an ice bath, mixture is filtered. The solid is dissolved in 200 ml. of chloroform and washed with two 30-ml. portions of 20% aqueous potassium iodide solution. The chloroform layer is dried (anhydrous MgSO$_4$) and concentrated to a residue of amorphous 9 - (2,3,5 - tri-O-benzoyl-5,5-dimethyl-D-ribofuranosyl)-6-methylpurine.

Example 7.—Preparation of 9-(2,3,5-tri-O-benzoyl-5,5-dimethyl-D-ribofuranosyl)-6-benzamidopurine A suspension of 2.82 grams (5.95 mmoles) of finely ground chloromercuri 6-benzamidopurine in 200 ml. of xylene is dried by distilling 100 ml. of xylene. The mixture is cooled and a solution of 2,3,5-tri-O-benzoyl-5,5-dimethyl-D-ribofuranosyl bromide [made from 3.0 grams (5.95 mmoles) of methyl 2,3,5-tri-O-benzoyl-5,5-dimethyl-D-ribofuranoside] in 30 ml. of dry xylene is added. The mixture is stirred and refluxed for 80 minutes. The hot mixture is filtered and the solid is washed with 25 ml. of hot xylene. The filtrate and washings are diluted with 400 ml. of petroleum ether, and after being kept at 5° C. for 20 hours, the mixture is filtered. The solid is dissolved in 300 ml. of chloroform and the solution is washed with two 20-ml. portions of 30% potassium iodide solution and two 20-ml. portions of water. Concentration of the dried chloroform layer gives amorphous product which is chromatographed on 70 grams of alumina in benzene-chloroform (1:4). Fractions showing only one zone($R_f$ 0.50) after thin layer chromatography on alumina in benzenechloroform (1:9) are combined and concentration of the solvent gives 1.42 grams (34%) of 9-(2,3,5-tri-O-benzoyl-5,5-dimethyl-D-ribofuranosyl) - 6 - benzamidopurine as an amorphous solid.

Example 8.—Preparation of 9-(5,5-dimethyl-D-ribofuranosyl)-6-dimethylaminopurine A suspension of 1.0 gram (1.57 mmole) of 9-(2,3,5-tri-O-benzoyl-5,5-dimethyl-D-ribofuranosyl)-6 - chloropurine as prepared in Example 4 in 25 ml. of methanol containing 6.5 grams of dimethylamine is heated for 10 hours in a sealed tube at 100° C. The solution is concentrated at reduced pressure and the residue is dissolved in 25 ml. of water. The water solution is washed with five 8-ml. portions of benzene and then treated with 2 grams of Dowex II–X8 which is a strongly basic anion exchange resin having a styrene divinyl benzene polymer matrix and containing quaternary ammonium groups. It has an average particle size in the range of 50–100 mesh. It is manufactured by the Dow Chemical Co. of Midland, Mich. (See page 1576, 7th ed., Merck Index, Merck & Co., Inc., Rahway, N.J.) The resin is filtered and washed with three 25-ml. portions of water. The filtrate is concentrated to dryness and 9-(5,5 - dimethyl - D - ribofuranosyl)-6-dimethylaminopurine is obtained.

Example 9.—Preparation of 9-(5,5-dimethyl-D-ribofuranosyl)-2,6-diaminopurine

A mixture of 1.2 grams (1.37 mmoles) of 9-(2,3,5-tri-O-benzoyl-5,5-dimethyl-D - ribofuranosyl) - 2,6 - dibenzamidopurine as prepared in Example 5 in 12 ml. of dry methanol is treated with a solution of 97 mg. of (4.2 mmoles) of sodium in 12 ml. of methanol. The mixture is refluxed for 3 hours and the resultant solution is concentrated at reduced pressure. The residue is dissolved in 24 ml. of water and the pH is adjusted to about 6.5. The aqueous solution is extracted with five 10-ml. portions of chloroform to remove methyl benzoate and concentrated at reduced pressure to a residue containing 9-(5,5-dimethyl-D-ribofuranosyl)-2,6-diaminopurine.

Example 10.—Preparation of 9-(5,5-dimethyl-D-ribofuranosyl)-purine-6-thiol

A suspension of 1.25 grams (1.96 mmoles) of 9-(2,3,5-tri-O-benzoyl-5,5,-dimethyl-D-ribofuranosyl) - 6 - chloropurine, prepared as in Example 4, and 307 mg. (4.0 mmoles) of thiourea in 3 ml. of ethanol is refluxed for 40 minutes. After 5 minutes a clear colorless solution is obtained which becomes yellow in 15 minutes and shortly thereafter colorless crystals of 9-(2,3,5-tri-O-benzoyl-5,5-dimethyl-D-ribofuranosyl)-purine-6-thiol crystallize out of solution.

A suspenson of 400 mg. (0.64 mmole) of 9-(2,3,5-tri-O-benzoyl-5,5-dimethyl-D-ribofuranosyl) - purine - 6-thiol in 3.5 ml. of dry methanol is treated with a solution made from 19.5 mg. of sodium and 3.5 ml. of dry methanol is added. Complete solution occurs immediately. The solution is refluxed for three hours. The solution is concentrated by distillation at reduced pressure and the residue is dissolved in 6 ml. of water and the pH of the solution is adjusted to 9 with acetic acid and the aqueous mixture is extracted with four 1.5 ml. portions of methylene chloride. The water layer is concentrated by distillation to a volume of 4 ml. and the pH is adjusted to 4 with acetic acid. The concentration of the solution gives a residue containing 9-(5,5-dimethyl-D-ribofuranosyl)-purine-6-thiol.

Example 11.—Preparation of 9-(5,5-dimethyl-D-ribofuranosyl)-6-methyl-aminopurine A mixture of 1 gram (1.6 mmoles) of 9-(2,3,5-tri-O-benzoyl-5,5-dimethyl-D-ribofuranosyl) - 6 - chloropurine and 8 grams of methylamine in 25 grams of dry methanol is heated for 10 hours at 100° C. in a sealed tube. The solution is concentrated to dryness at reduced pressure and the residue is dissolved in 25 ml. of water. The water solution is washed with two 5-ml. portions of benzene. The aqueous layer is stirred for 2.5 hours with 3.5 grams of moist Dowex II–X8 (see Example 8), during which time the pH of the solution rises from 7 to 9. The resin is removed and washed with three 15-ml. portions of water. The filtrate and washings are concentrated to a residue containing 9-(5,5-dimethyl-D-ribofuranosyl)-6-methylaminopurine.

Example 12.—Preparation of 9-(5,5-dimethyl-D-ribofuranosyl)purine

A solution of 1 gram (1.6 mmoles) of 9-(2,3,5-tri-O-benzoyl-5,5-dimethyl-D-ribofuranosyl)-6-chloropurine in 17 ml. of dioxane with 80 mg. (2.0 mmoles) of magnesium oxide and 0.5 gram of 5% palladium on charcoal catalyst is shaken for 98 hours in an atmosphere of hydrogen at 25° C. The mixture is filtered and concentrated by distillation at reduced pressure to a residue containing 9-(2,3,5-tri-O-benzoyl-5,5 - dimethyl - D - ribofuranosyl) purine.

A solution of 400 mg. (0.69 mmole) 9-(2,3,5-tri-O-benzoyl-5,5-dimethyl-D-ribofuranosyl)purine in 8 ml. of dry methanol is treated with a solution made from 23 mg. (1 mg. atom) of soduim and 8 ml. of dry methanol. The pale yellow solution is refluxed for 3 hours and concentrated to dryness at reduced pressure. The residue is dissolved in 15 ml. of water and the pH is adjusted to 6.5 with acetic acid. The solution is extracted with four 5-ml. portions of chloroform and the water phase is concentrated to dryness at reduced pressure to a residue containing 9-(5,5-dimethyl-D-ribofuranosyl)purine.

A suspension of 800 mg. (1.2 mmoles) of 9-(2,3,5-tri-O-benzoyl-5,5-dimethyl-D-ribofuranosyl) - 2 - acetamido-6-hydroxypurine in 8 ml. of dry methanol is treated with a solution made from 105 mg. (4.5 mg. atom) of sodium and 8 ml. of dry methanol and the mixture is refluxed for two hours. The mixture is concentrated to dryness. The residue is dissolved in 35 ml. of water and the pH is adjusted to 7 by the addition of acetic acid. The clear solution is washed with three 8-ml. portions of chloroform and the aqueous layer is concentrated to a residue of 9-(5,5-dimethyl-D-ribofuranosyl)guanine.

Example 13.—Preparation of 9-(5,5-dimethyl-D-ribofuranosyl)-6-chloropurine

A solution of 479 mg. (0.98 mmole) of 9-(2,3,5-tri-O-benzoyl - 5,5 - dimethyl - D - ribofuranosyl) 6 - chloropurine, as prepared in Example 4, in 20 ml. of cold methanol containing 2 grams of anhydrous ammonia is kept at 5° C. for 20 hours. The solution is concentrated at reduced pressure and at a temperature of less than 20° C. The residue is recrystallized from methanol to give 9 - (5,5 - dimethyl - D - ribofuranosyl) - 6 - chloropurine.

Example 14.—Preparation of 9-(5,5-dimethyl-D-ribofuranosyl)-6-methylaminopurine About 150 ml. of xylene is distilled from a suspension of 9.5 grams (19.5 mmoles) of chloromercuri-6-(N-methylbenzamido) purine in 500 ml. of xylene. The mixture is cooled and a solution of 2,3,5-tri-O-benzoyl-5,5-dimethyl-D-ribofuranosyl bromide (from 7.1 grams (14.1 mmole) of methyl 2,3,5-tri-O-benzoyl-5,5-dimethyl-β-D-ribofuranoside) and 50 ml. of dry xylene is added. The reaction mixture is stirred and refluxed for 30 minutes. The hot mixture is filtered and 3 grams of unreacted starting chloromercuri purine is recovered. The filtrate is concentrated to dryness and the residual oil in 300 ml. of chloroform is washed with two 100-ml. portions of 30% potassium iodide and two 100-ml. portions of water. The residual oil obtained after removal of the chloroform is chromatographed on a short column of 140 grams of acid-washed alumina in benzene-chloroform (1:9). Fractions containing only product are combined and concentrated giving 9 - (2,3,5 - tri - O - benzoyl - 5,5 - dimethyl - D-ribofuranosyl) - 6 - (N - methylbenzamido) purine as a glass.

A suspension of 3.9 grams (5.45 mmoles) of 9-(2,3,5-tri - O - benzoyl - 5,5 - dimethyl - D - ribofuranosyl) - 6-(N-methylbenzamido) purine in 40 ml. of dry methanol is treated with a solution made from 175 mg. (7.6 mg. atom) of sodium in 40 ml. of dry methanol and the solution is refluxed for 3.5 hours. The methanol is removed and the solution of the residue in 76 ml. of water is neutralized (pH 7.0) with acetic acid and washed with three 10-ml. portions of chloroform. The aqueous layer is concentrated by distillation to a residue of 9-(5,5-dimethyl-D-ribofuranosyl)-6-methylaminopurine.

Example 15.—Preparation of 9-(5,5-dimethyl-D-ribofuranosyl)-6-ethylaminopurine A solution of 2.0 grams (3.2 mmoles) of 9-(2,3,5-tri - O - benzoyl - 5,5 - dimethyl -D - ribofuranosyl) - 6-chloropurine as prepared in Example 4, in 30 ml. of ethanol containing 12 ml. of ethyl amine is heated in a sealed tube at 100° C. for 10 hours. After removing the solvent, the residue is dissolved in 60 ml. of water and extracted with three 15-ml. portions of ether. The aqueous layer (pH 6.5) is stirred for 1 hour with 2.5 grams of Dowex II–X8 (see Example 8). The resin is removed and washed with four 10-ml. portions of water. The combined filtrate and washings are concentrated to a residue of 9-(5,5-dimethyl-D-ribofuranosyl)-6-ethylaminopurine.

Example 16.—Preparation of 9-(5,5-dimethyl-D-ribofuranosyl)-6-methylthiopurine A boiling mixture of 605 mg. (1.9 mmoles) of 9-(5,5-dimethyl-D-ribofuranosyl)-6-chloropurine, as prepared in Example 14, in 30 ml. of anhydrous methanol is treated with a solution prepared by saturating 20 ml. of 0.1 N sodium methoxide in methanol with methyl mercaptan. After being refluxed for about 30 minutes the solution is cooled and concentrated to dryness. The residue is dissolved in hot water and on cooling, 9-(5,5-dimethyl-D-ribofuranosyl)-6-methylthiopurine separates.

Example 17.—Preparation of 9-(5,5-dimethyl-D-ribofuranosyl)-6-methylpurine

A mixture of 590 mg. (0.98 mmole) of 9-(2,3,5-tri-O-benzoyl - 5,5 - dimethyl - D - ribofuranosyl) - 6 - methylpurine, as prepared in Example 6, and 50 ml. of dry methanol is treated with a solution prepared from 23 mg. (1 mg. atom) of sodium and 10 ml. of dry methanol. The mixture is refluxed for 4 hours and concentrated to dryness. The residue is dissolved in 30 ml. of water and neutralized (pH 7) with acetic acid. When the water layer is concentrated to a small volume and cooled, 9-(5,5-dimethyl-D-ribofuranosyl)-6-methylpurine precipitates.

Example 18.—Preparation of 5′,5′-dimethyladenosine

A mixture of 1.48 grams (2.08 mmoles) of 9-(2,3,5-tri - O - benzoyl - 5,5 - dimethyl - β - D - ribofuranosyl) 6-benzamido purine as prepared in Example 7 and 15 ml. of dry methanol is treated with a solution of sodium methoxide prepared from 70 mg. (3 mmoles) of sodium and 5 ml. of methanol. After the mixture is refluxed for 45 minutes, it is concentrated and the residue is dissolved in 50 ml. of water. The pH is adjusted to 6.8 with a few drops of acetic acid. The solution is extracted with three 20-ml. portions of chloroform and the water layer is filtered and concentrated to dryness. The residue is dissolved in 30 ml. of hot ethanol, concentrated to 10 ml. and impure amorphous product is precipitated with ether. The filtrate is concentrated to dryness and the residue is precipitated by concentrating a methanol solution, giving 360 mg. (59%) of 5′,5′-dimethyladenosine.

The following table demonstrates the ability of one of the compounds of the present invention to inhibit nucleic acid biosynthesis. The method employed for the cytotoxicity is that described by C. O. Gitterman, et al. Journal of Medicinal Chemistry, volume 8, page 664, 1965. The results of this test are shown in the following Table I.

TABLE I

|  | Glycine-C¹⁴ incorporation into acid insoluble RNA | | Cytotoxicity (CE,γ/ml.) KB cells |
|---|---|---|---|
|  | γ/ml. | Percent inhibition |  |
| 9-(5,5-dimethyl-D-ribofuranosyl)-6-aminopurine | 500 | 25 | 100 |

The results shown in the foregoing Table I are expressed as percent inhibition of the incorporation of glycine-C¹⁴ as compared to a controlled experiment carried out without the inhibitor. The cytotoxicity of the compound of the present invention was determined by using KB cells.

While specific embodiments of the present invention have been named and described, it will be apparent to those skilled in the art that changes may be made in the detail shown without departing from the spirit of the present invention or the scope intended. Any departure from the above description which conforms to the present invention is intended to be included within the scope of the claims.

I claim:

1. A compound of the formula

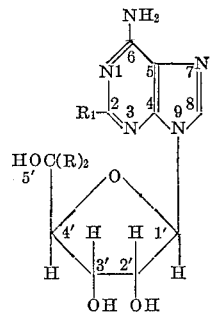

where R is loweralkyl and $R_1$ is hydrogen or loweralkyl.

2. The compound of claim 1, which compound is 2,3,5-tri-O-benzoyl-5,5-dimethyl-4-ribofuranosyl bromide.

3. A compound of the formula

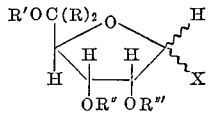

where R′, R″ and R′″ are acetyl, butyryl, and benzoyl; R is loweralkyl, and X is halogen.

4. The compound of claim 3, which compound is 5',5'-dimethyl adenosine.

5. The compound of claim 3, which compound is 9-(5',5'-diethyl-D-ribofuranosyl)-6-aminopurine.

6. The compound of claim 3, which compound is 9-(5',5'-dimethyl-D-ribofuranosyl)-2-methyl-6-aminopurine.

References Cited

UNITED STATES PATENTS

| | | | |
|---|---|---|---|
| 2,719,843 | 10/1955 | Davoll et al. | 260—211.5 |
| 2,876,230 | 3/1959 | Folkers et al. | 260—211.5 |
| 3,074,930 | 1/1963 | Hitchings et al. | 260—211.5 |
| 3,116,282 | 12/1963 | Hunter | 260—211.5 |
| 3,225,029 | 12/1965 | Yamaoka | 260—211.5 |

LEWIS GOTTS, *Primary Examiner*.

J. R. BROWN, *Assistant Examiner*.

U.S. Cl. X.R.

167—33, 65; 260—210, 211.5